United States Patent
Niinuma et al.

(10) Patent No.: US 12,073,655 B2
(45) Date of Patent: Aug. 27, 2024

(54) IMAGE SYNTHESIS FOR PERSONALIZED FACIAL EXPRESSION CLASSIFICATION

(71) Applicant: FUJITSU LIMITED, Kawasaki (JP)

(72) Inventors: Koichiro Niinuma, Pittsburgh, PA (US); Jeffrey F. Cohn, Pittsburgh, PA (US); Laszlo A. Jeni, Pittsburgh, PA (US)

(73) Assignees: FUJITSU LIMITED, Kawasaki (JP); CARNEGIE MELLON UNIVERSITY, Pittsburgh, PA (US)

( * ) Notice: Subject to any disclaimer, the term of this patent is extended or adjusted under 35 U.S.C. 154(b) by 386 days.

(21) Appl. No.: 17/392,077

(22) Filed: Aug. 2, 2021

(65) Prior Publication Data
US 2023/0029505 A1    Feb. 2, 2023

(51) Int. Cl.
*G06V 40/16*   (2022.01)
*G06F 18/214*  (2023.01)
*G06F 21/32*   (2013.01)
*G06N 20/00*   (2019.01)

(52) U.S. Cl.
CPC .......... *G06V 40/174* (2022.01); *G06F 18/214* (2023.01); *G06F 21/32* (2013.01); *G06N 20/00* (2019.01); *G06V 40/172* (2022.01)

(58) Field of Classification Search
None
See application file for complete search history.

(56) References Cited

U.S. PATENT DOCUMENTS

| | | | | |
|---|---|---|---|---|
| 11,393,133 | B2 * | 7/2022 | el Kaliouby | G06T 11/00 |
| 2010/0266213 | A1 * | 10/2010 | Hill | A61B 5/16 |
| | | | | 382/218 |
| 2020/0219295 | A1 * | 7/2020 | el Kaliouby | G06T 11/00 |
| 2021/0056291 | A1 * | 2/2021 | Doublet | G06V 40/18 |

OTHER PUBLICATIONS

Y. -I. Tian, T. Kanade and J. F. Cohn, "Recognizing action units for facial expression analysis," in IEEE Transactions on Pattern Analysis and Machine Intelligence, vol. 23, No. 2, pp. 97-115, Feb. 2001, doi: 10.1109/34.908962. (Year: 2001).*

W.-S. Chu, F. De la Torre and J. F. Cohn, "Selective Transfer Machine for Personalized Facial Expression Analysis," in IEEE Transactions on Pattern Analysis and Machine Intelligence, vol. 39, No. 3, pp. 529-545, Mar. 1, 2017, doi: 10.1109/TPAMI.2016.2547397. (Year: 2017).*

Martinez et al., "Automatic Analysis of Facial Actions: A Survey", IEEE Transactions on Affective Computing (2017).

(Continued)

*Primary Examiner* — Tahmina N Ansari
(74) *Attorney, Agent, or Firm* — Maschoff Brennan

(57) ABSTRACT

A method may include obtaining a facial image of a subject and identifying a number of new images to be synthesized with target AU combinations and categories of intensity. The method may also include synthesizing the number of new images using the facial image of the subject as the base image with the number of target AU combinations and categories of intensity with a number of new images that have different AU combinations than the facial image of the subject. The method may additionally include adding the number of new images to a dataset and training a machine learning system using the dataset to identify a facial expression of the subject.

19 Claims, 6 Drawing Sheets

(56) References Cited

OTHER PUBLICATIONS

Li et al., "Deep Facial Expression Recognition: A Survey", IEEE Transactions on Affective Computing (2020).
Yang et al., "Identity-Adaptive Facial Expression Recognition Through Expression Regeneration Using Conditional Generative Adversarial Networks" IEEE 2018.
Wang et al., "Personalized Multiple Facial Action Unit Recognition through Generative Adversarial Recognition Network" Oct. 22, 2018.
Niinuma et al., "Synthetic Expressions Are Better Than Real for Learning to Detect Facial Actions" WACV Jan. 5, 2021.
Cohn, J. F., Ambadar, Z., & Ekman, P. (2007). Observer-based measurement of facial expression with the Facial Action Coding System, in J. A. Coan & J. J. B. Allen (Eds.), Handbook of emotion elicitation and assessment. Oxford University Press Series in Affective Science (pp. 203-221). Oxford University.
Ekman, P., Friesen, W. V., & Hager, J. C. (2002). Facial action coding system. Research Nexus, Network Research Information, Salt Lake City, UT.

* cited by examiner

IMAGE SYNTHESIS FOR PERSONALIZED FACIAL EXPRESSION CLASSIFICATION

FIELD

Embodiments of the present disclosure relate to image synthesis for personalized facial expression classification.

BACKGROUND

Image analysis can be performed on images of faces to identify which facial expression is being made. Facial expression can communicate emotion, intention, and pain, and may be used in interpersonal behavior. Often, these facial expressions are characterized based on the Facial Action Coding System (FACS) using Action Units (AUs), where each AU may correspond to the relaxation or contraction of a particular muscle or group of muscles. Each AU may further be characterized by a category of intensity, often labeled 0 and A-E with 0 representing no category of intensity or the absence of the AU, and A-E ranging from trace to maximum intensity, respectively. A given emotion may be characterized as a combination of AUs, which may include variations in intensity, such as AU 6B+12B (cheek raiser and lip corner puller, each at a mild level of intensity).

SUMMARY

One or more embodiments of the present disclosure may include a method that includes obtaining a facial image of a subject and identifying a number of new images to be synthesized with target AU combinations and categories of intensity. The method may also include synthesizing the number of new images using the facial image of the subject as the base image with the number of target AU combinations and categories of intensity with a number of new images that have different AU combinations than the facial image of the subject. The method may additionally include adding the number of new images to a dataset and training a machine learning system using the dataset to identify a facial expression of the subject.

The object and advantages of the embodiments will be realized and achieved at least by the elements, features, and combinations particularly pointed out in the claims.

It is to be understood that both the foregoing general description and the following detailed description are merely examples and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

Figure 1:
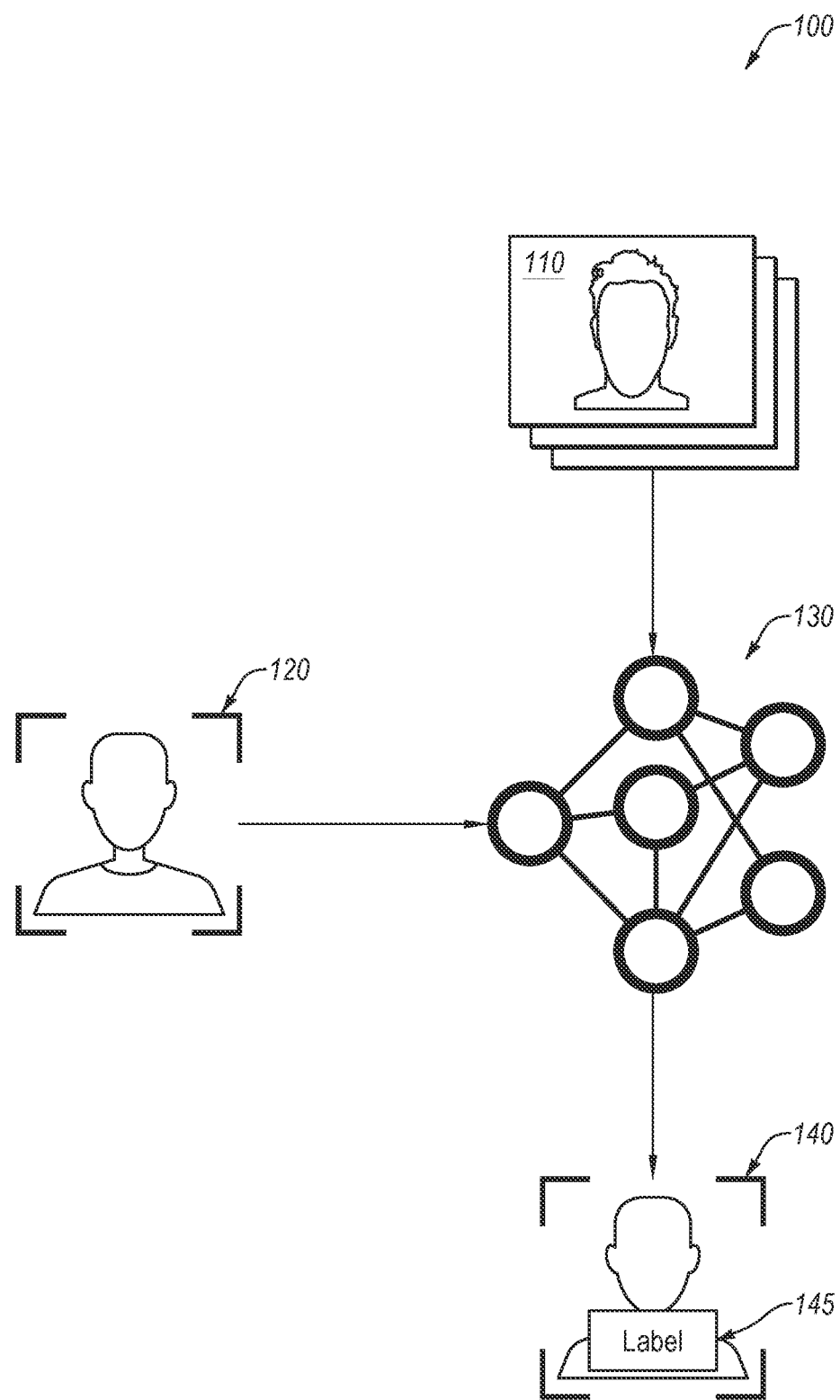
FIG. 1 is a diagram illustrating an example environment that may be used for image analysis on a facial image.

The present disclosure relates to the generation of a personalized dataset that may be used to train a machine learning system based on the AU combinations and/or their categories of intensity in training images. The machine learning system trained based on the personalized dataset may be used to classify the facial expression of an input image. In some potential training datasets, the images used to train the dataset are generic across all faces, which may not be as accurate. The present disclosure provides a personalized dataset in order to train a machine learning system to more accurately classify individual facial expressions. While the term image is used, it will be appreciated that it is equally applicable to any other representations of faces.

In some embodiments, an input image of an individual may be analyzed to determine the AU combination and categories of intensity present in the input image and, based on the determination, identify additional images to be synthesized to provide a sufficient number of images to train the machine learning system (e.g., identify images to provide a greater variety of AU combinations and categories of intensity for the image in the training dataset). The personalized training dataset may be used to train a machine learning system for image classification using images that are all based on the individual and may therefore be referred to as being "personalized." To do so, the machine learning system may first be trained generically to be applicable to any person, and may afterwards be tuned or further trained based on the images of the specific individual to become personalized.

After training, the machine learning system may be used to label an input image of the same individual with AU combinations and/or categories of intensity within the input image. For example, the machine learning system may identify which AUs are present (e.g., a binary decision) and/or the categories of intensity of the AUs that are present (e.g., multiple potential intensity levels). The identified AU combinations and/or categories of intensity may then be used to classify the facial expression of the subject in the input image. For example, if the input image is identified by the trained machine learning system as having an AU combination of 6+12, the input image facial expression may be classified as, or including, a smile.

Certain embodiments of the present disclosure may provide improvements over previous iterations of machine learning systems for facial image analysis. For example, embodiments of the present disclosure may provide a more personalized dataset for training such that the machine learning system is better able to identify and classify the facial expression of an input image to the machine learning system because it has been trained based on images of an individual, rather than generically trained using a variety of images of a variety of individuals. Additionally, because the present disclosure synthesizes certain images, certain embodiments may permit a machine learning system to operate with a training set with fewer initial input images, reducing the cost (both computationally and economically) of preparing a larger training dataset. Additionally, because the present disclosure may provide a superior training set to the machine learning system, the machine learning system itself may operate more efficiently and arrive at a determination more quickly, thus saving computing resources and time spent on longer analyses compared to the present disclosure.

One or more example embodiments are explained with reference to the accompanying drawings.

FIG. 1 is a diagram illustrating an example environment 100 that may be used for image analysis on a facial image, in accordance with one or more embodiments of the present disclosure. As illustrated in FIG. 1, the environment 100 may include a dataset 110 of images that may be used to train a machine learning system 130. After being trained, the machine learning system 130 may analyze an image 120 and generate a labeled image 140 with a label 145. For example, the label 145 may be applied to the image 120 to generate the labeled image 140.

The dataset 110 may include one or more labeled images. For example, the dataset 110 may include images of the face of an individual that may be labeled to identify which AUs are expressed in the images and/or the categories of intensity of the AUs in the images. In some embodiments, one or more of the images in the dataset 110 may be artificially synthesized rather than being a native image such as an image captured by a camera or other image sensor. In some embodiments, the images of the dataset 110 may be manually labeled or may be automatically labelled. In these and other embodiments, the images of the dataset 110 may all be of the same individual such that when the machine learning system 130 is trained using the dataset 110, it is personalized for that individual.

The image 120 may be any image that includes a face. The image 120 may be provided as an input to the machine learning system 130.

The machine learning system 130 may include any system, device, network, etc. that is configured to be trained based on the dataset 110 such that the machine learning system 130 is able to identify the AUs and/or their respective categories of intensity in the image 120. In some embodiments, the machine learning system 130 may include a deep learning architecture, such as a deep neural network, an artificial neural network, a convolutional neural network (CNN), etc. The machine learning system 130 may output the label 145, identifying one or more of the AUs in the image 120 and/or their respective categories of intensity. For example, the machine learning system 130 may identify which AUs are present (e.g., a binary decision) and/or the intensities of the AUs that are present (e.g., multiple potential intensity levels). Additionally or alternatively, the machine learning system 130 may identify which AUs and/or categories of intensity are not present (e.g., the lack of combination 6+12).

In some embodiments, the machine learning system 130 may be trained generically to perform the image labeling across images of any face. An example of such training may be described in U.S. application Ser. No. 16/994,530 ("IMAGE SYNTHESIS FOR BALANCED DATASETS"), the entire disclosure of which is hereby incorporated by reference in its entirety. After being trained generically for any face, the machine learning system 130 may be further trained, tuned, etc. using images of a single individual such that the performance of the machine learning system 130 with respect to that person is improved as compared to the performance of the generically trained machine learning system.

The labeled image 140 may represent the image 120 when labeled with the label 145 indicating the AUs and/or their respective categories of intensity as determined by the machine learning system 130.

Modifications, additions, or omissions may be made to the environment 100 without departing from the scope of the disclosure. For example, the designations of different elements in the manner described is meant to help explain concepts described herein and is not limiting. Further, the environment 100 may include any number of other elements or may be implemented with other systems or environments than those described.

Figure 2A:
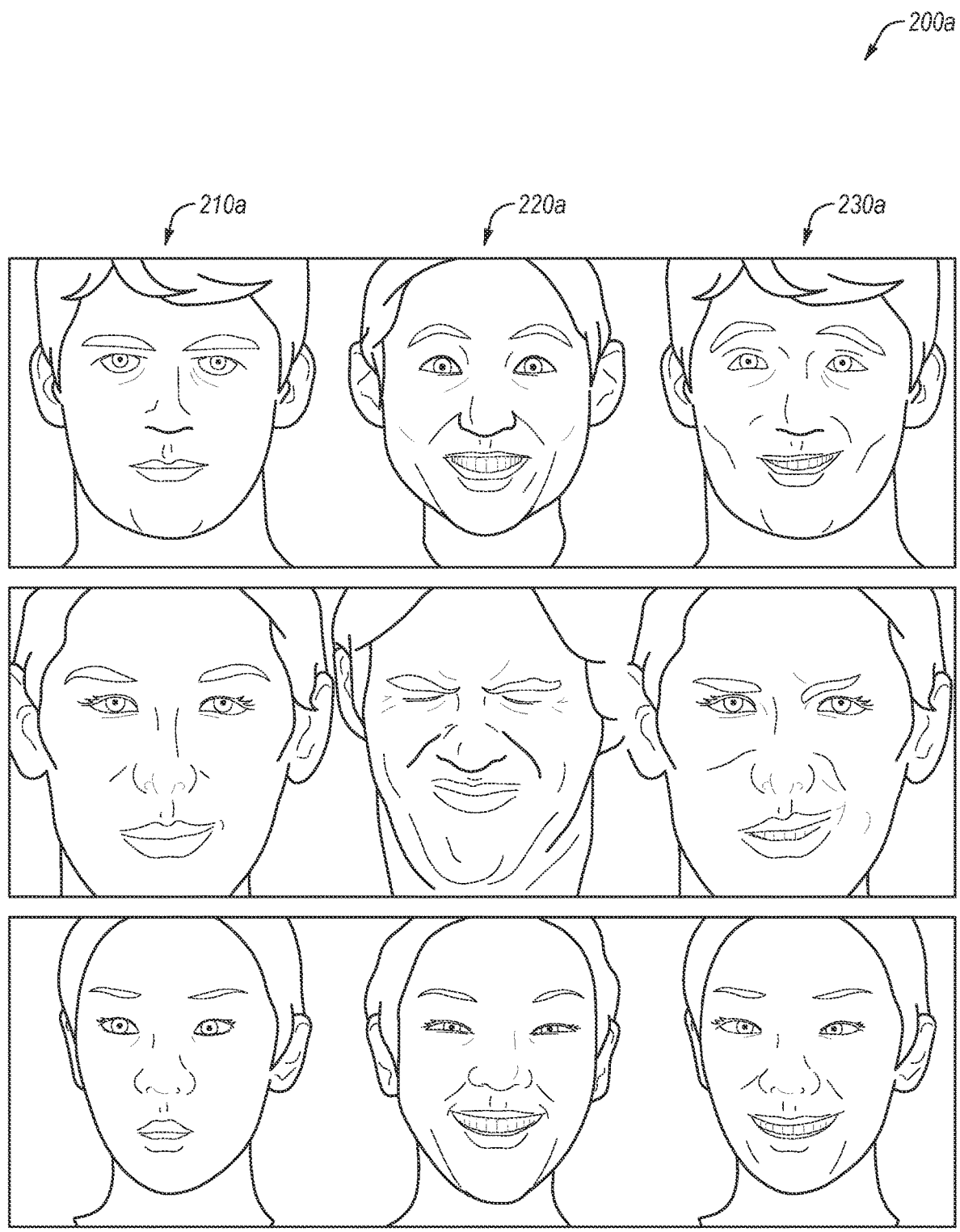
FIGS. 2A and 2B illustrate examples of facial images, including synthesized facial images using different synthesizing techniques.
Figure 2B:
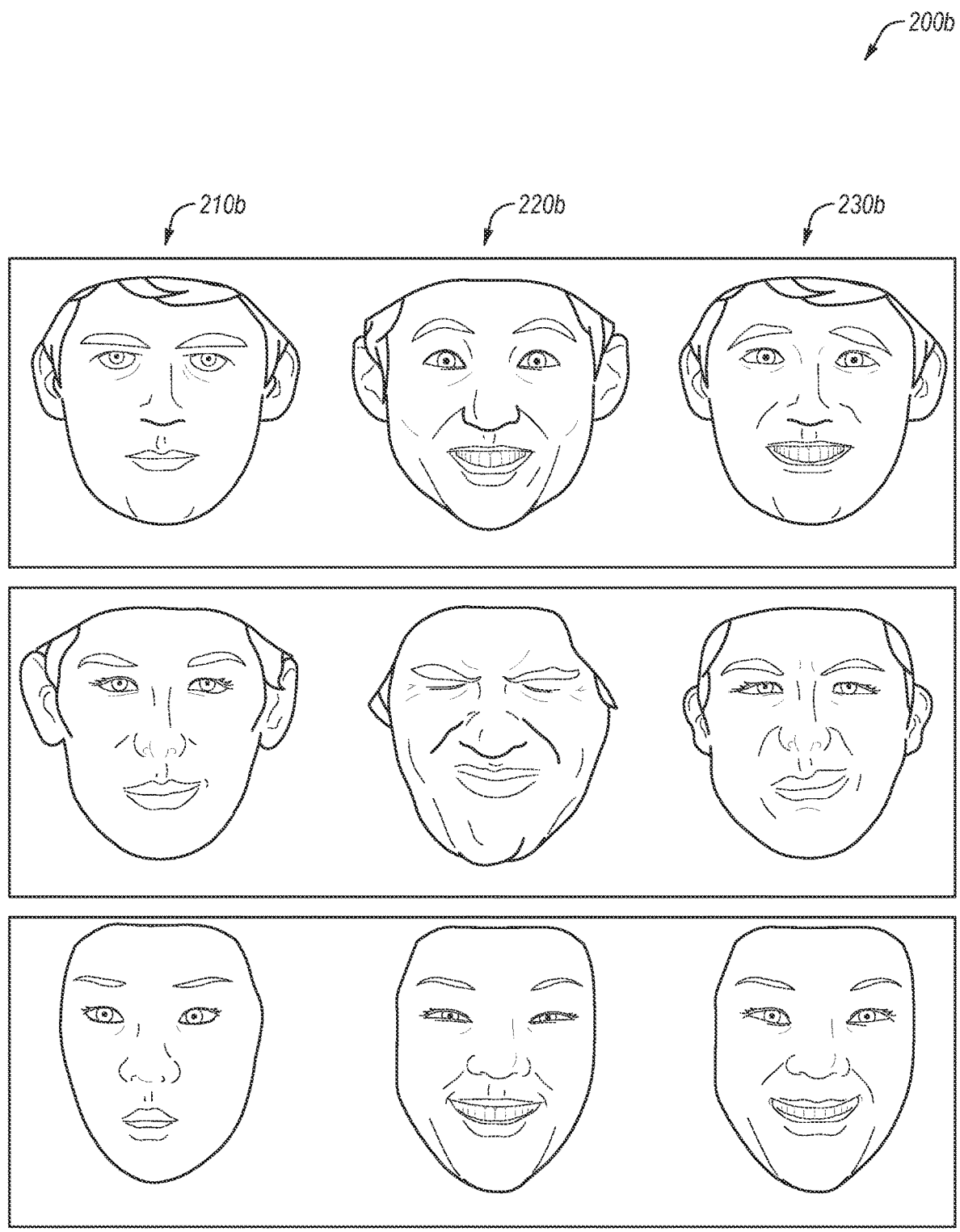

FIGS. 2A and 2B illustrate examples of facial images 200*a* and 200*b*, including synthesized facial images 230*a* and 230*b* using different synthesizing techniques, in accordance with one or more embodiments of the present disclosure. The synthesized images 230*a* of FIG. 2A are synthesized based on a two-dimensional (2D) registration of input images 210*a*, and the synthesized images 230*b* of FIG. 2B are synthesized based on a three-dimensional (3D) registration of input images 210*b*.

The facial images 200*a* of FIG. 2A include input images 210*a*, target images 220*a*, and the synthesized images 230*a*. The input images 210*a* may be selected as the images from which the synthesized images are based. In some embodiments, the input images 210*a* may include facial images with little or no wrinkles and/or a neutral expression. The input images 210*a* may include faces pointing generally straight on.

In some embodiments, the input images 210*a* may have a 2D registration of the input image 210*a* performed. For example, the 2D registration may map the points of the 2D image to various facial features, landmarks, muscle groups, etc. In some embodiments, the 2D registration may map various facial features, landmarks, muscle groups, etc. of the input images 210*a* to the target image 220*a*. The synthesized images 230*a* may be based on the 2D registration of the input images 210*a*.

The target images 220*a* may represent the desired facial expression (e.g., a facial image depicting the desired AU combination and categories of intensity to be synthesized to balance the dataset). The input images 210*a* may or may not be the same identity (e.g., depict the same person) as the target image 220*a*.

With reference to FIG. 2A, the synthesized images 230*a* may have various artifacts based on the 2D registration. For example, holes or gaps in the faces may occur, and certain facial features may be skewed or otherwise have an inhuman appearance.

In FIG. 2B, the input images 210*b* and the target images 220*b* may be similar or comparable to the input images 210*a* and the target images 220*a* of FIG. 2A. A 3D registration of the input images 210*b* and/or the target images 220*b* may be performed. For example, rather than a 2D image, a 3D projection of the faces depicted in the input images 210*b* and the target images 220*b* may be generated. By doing so, a more complete, robust, and/or accurate mapping between the input images 210*b* and the target images 220*b* may be obtained.

Based on the 3D registration, the synthesized images 230*b* may be performed using the input images 210*b* as the base. As can be observed, the synthesized images 230*b* of FIG. 2B are higher quality than the synthesized images 230*a* of FIG. 2A. For example, there are fewer artifacts, and the facial features more closely resemble the target images 220*b*.

Modifications, additions, or omissions may be made to the facial images 200*a*/200*b* without departing from the scope of the disclosure. For example, the designations of different elements in the manner described is meant to help explain concepts described herein and is not limiting. Further, the facial images 200*a*/200*b* may include any number of other elements or may be implemented with other systems or environments than those described. For example, any number of input images, target images, and/or synthesized images may be used.

Figure 3:
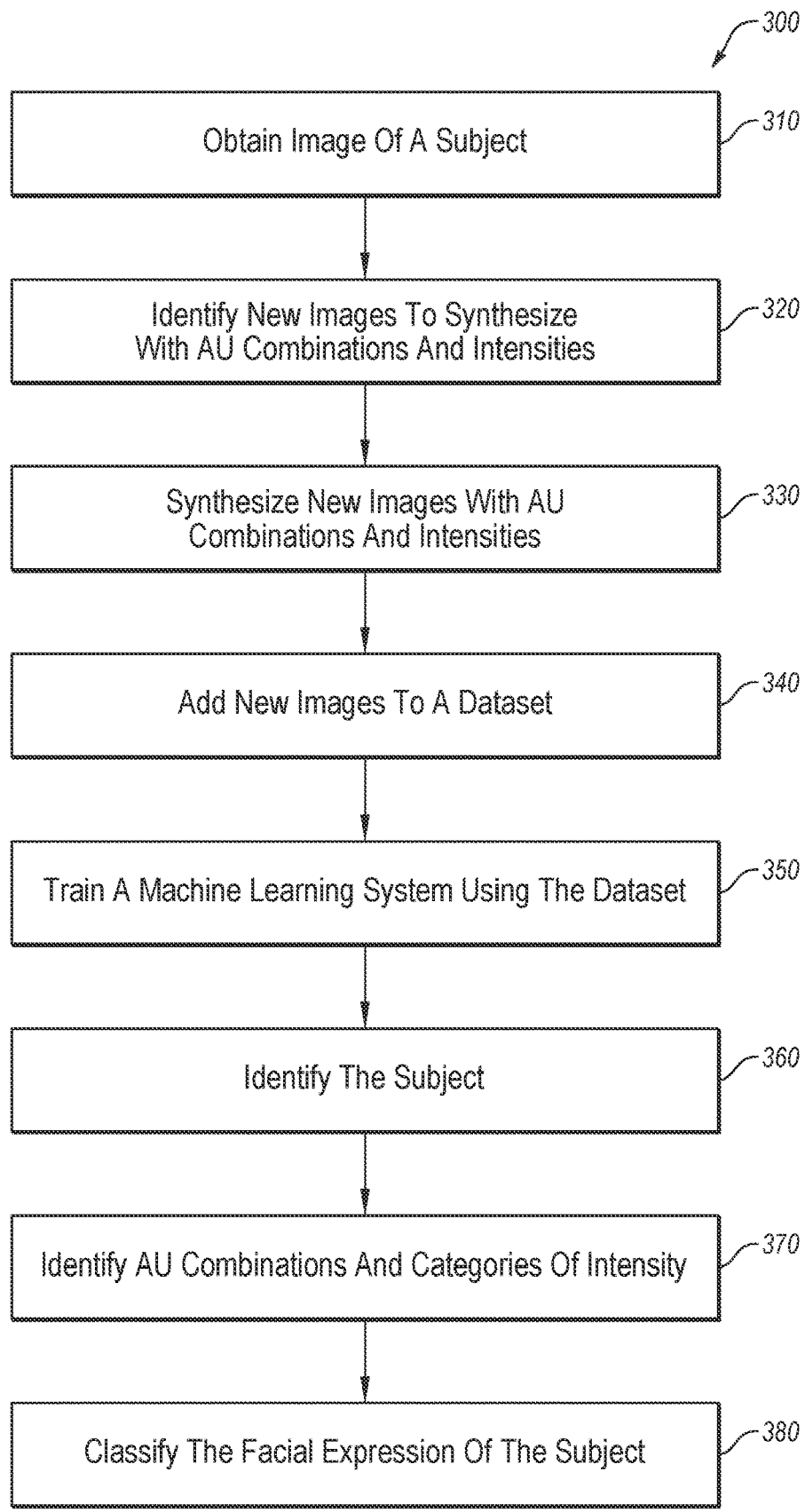
FIG. 3 illustrates an example flowchart of an example method of personalized facial expression classification.

FIG. 3 illustrates an example flowchart of an example method 300 of image synthesis for personalized facial expression classification, in accordance with one or more embodiments of the present disclosure. For example, the method 300 may be performed to generate a personalized dataset for training a machine learning system to identify facial expressions for an input image of a given subject (e.g., by identifying the AU combination and respective categories of intensity). One or more operations of the method 300 may be performed by a system or device, or combinations thereof, such as any computing devices hosting any components of the environment 100 or 400 of FIGS. 1 and/or 4, such as a computing device hosting the training dataset 110, the machine learning system 130 etc. Although illustrated as discrete blocks, various blocks of the method 300 may be divided into additional blocks, combined into fewer blocks, or eliminated, depending on the desired implementation.

At block 310, an image of a subject may be obtained that includes at least the face of the subject. The image of the subject may be obtained through any method wherein the final result is a 2D image of at least the face of the subject. For example, the image of a subject may be obtained through a 3D rendering of the face of the subject, and the 3D rendering may be mapped and subsequently rasterized into a 2D image.

At block 320, an identification may be made regarding a number of new images to be synthesized in order to generate different AU combinations and categories of intensity to generate a personalized dataset for the subject. In these and other embodiments, the number of images may be a number sufficient to train a machine learning system. For example, the number of images to be synthesized may be the number of images to depict each AU combination and category of intensity for the input image. In some embodiments, the number of new images can be a discrete number with predetermined AU combinations and categories of intensity. Additionally or alternatively, the number of new images may be dependent on the input image and the AU combinations and categories of intensity already present in the input image. In some embodiments, the number of new images may be determined based on the purpose or use to which the machine learning system is to be applied. For example, if the end user, application, algorithm etc. is to be used to identify only if the individual is smiling, the number of images synthesized may revolve primarily around the AU combinations and categories of intensity associated with smiling.

At block 330, the number of new images identified in block 320 may be synthesized with associated AU combinations and categories of intensity. In some embodiments, a neutral expression may be used as the base image when synthesizing the new images. Additionally or alternatively, a 3D registration may be made of the input image and/or the new image (e.g., the image depicting the AU combination and category of intensity for which the additional image is being synthesized) to facilitate synthesis of a high-quality image. In some embodiments, one or more loss parameters may be utilized when synthesizing the images to facilitate generation of high-quality images.

At block 340, the new images synthesized at block 330 may be added to a dataset. For example, the input image and the synthesized images with their labeled AU combinations and categories of intensity may be added to a dataset, such that the dataset contains the input image and the images synthesized at the block 330. In alternate embodiments, a dataset may include images of facial expressions not related to the input image labeled with AU combinations and categories of intensity. For example, a number of public facial images of the subject may be collected (e.g., from the social media page of the subject or from the electronic device of the subject), labeled with the AU combinations and categories of intensity present in each image of the subject (e.g., automatically or manually), and grouped in a dataset along with the input image and number of synthesized images from blocks 310, 320, and 330. Additionally or alternatively, the dataset may include a number of input images associated with different users collected and synthesized according to blocks 310, 320, and 330.

At block 350, the machine learning system may be trained using the dataset generated at block 340. For example, the machine learning system may be trained to identify the facial expressions of the subject in an input image of the subject. For example, a CNN may be trained using a dataset to facilitate labeling of an image using the CNN. After being trained, the CNN may be provided an unlabeled input image of the subject's face. Using the trained CNN, the input image may be labelled with an identified facial expression (for example, by identifying the AU combination and/or associated categories of intensity). In some embodiments, the machine learning system may be one which is already trained generically for any face, and the training at the block 350 may be personalization of the machine learning system. An example of such a generically trained machine learning system may be described in U.S. application Ser. No. 16/994,530 ("IMAGE SYNTHESIS FOR BALANCED DATASETS"), the entire disclosure of which is hereby incorporated by reference in its entirety.

At block 360, the subject may be identified. In some embodiments, identification and/or verification of the subject may be made through fingerprint authentication, password verification, passcode verification, fingerprint verification, iris scan, or multifactorial authentication, etc. For example, the subject may use an electronic device with a camera to login to an application operating on a computing system performing one or more of the operations of the method 300 using facial identification. Additionally or alternatively, the machine learning system may assume the subject's identity based on the device being used. For example, instead of providing a passcode, password, facial recognition etc., the subject may prefer that the machine learning system identify the subject based on the Internet Protocol (IP) address of the device being used (e.g., the subject's mobile device). Additionally or alternatively, the machine learning system may identify the face of the subject through a captured image where the entire face is substantially visible. In some embodiments, the identification of the AU combinations and associated categories of intensity may occur using the same image obtained in block 310.

At block 370, the machine learning system may identify the AU combinations and categories of intensity in an input image of the subject (e.g., the person whose identity was identified/verified at the block 360). For example, if the subject was identified at block 360 using facial recognition, the machine learning system may use the image collected to perform facial recognition as the input image from which to identify AU combinations and categories of intensity. Additionally or alternatively, images of the subject may be obtained from the camera on the subject's device or a video monitoring the subject. For example, after identifying the subject, a device may direct another camera or imaging device monitoring the subject to collect images of the subject to classify the facial expression of the subject. In some embodiments, the subject identified at block 360 may have an image captured or multiple images captured of the subject's face. For example, the machine learning system trained in block 350 with the dataset from block 340 which is made up of at least the input image at block 310 and the synthesized images at block 330, may obtain a number of unlabeled images from the subject and identify the AU combinations and categories of intensity associated with the unlabeled image or images.

At block 380, the facial expression of the subject may be classified. For example, if the machine learning system identifies AU combination 6+12 (cheek raise and lip corner puller) representing happiness, the machine learning system may classify the subject's facial expression as a smile. Additionally or alternatively, the machine learning system may classify the user's level of emotion based on the AU combinations and the associated categories of intensity. For example, again using AU combination 6+12, if the combination is associated with maximum intensity E, the machine learning system may classify the subject's smile differently than if the AU combination is associated with minimum intensity A.

In some embodiments, facial expressions may be classified as emotions (such as happy) instead of descriptive facial features, like smile. In some embodiments, the facial expressions may be used as a surrogate input for another process. For example, the facial expression may be classified as a "like" or a "dislike" or a "quasi-like" or "quasi-dislike" on a social media post. For example, as the subject watches a TIKTOK® stream and smiles, the electronic device may automatically treat the smile as a "like" on the stream. As another example, the facial expressions of medical patients may be monitored to facilitate determination of their pain level or discomfort over time (e.g., as their facial expression proceeds to form a grimace that becomes more and more intense, it is more and more likely the patient is in discomfort). As an additional example, the classification of the facial expression may be used to indicate how receptive the subject is to a given advertisement. For example, if the identified classification of the facial image indicates enjoyment, surprise, attentiveness, etc., that classification may indicate that the subject may be receptive to similar advertising and/or to the product or similar products provided or displayed in the advertisement.

Modifications, additions, or omissions may be made to the method 300 without departing from the scope of the disclosure. For example, the operations of the method 300 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 4:
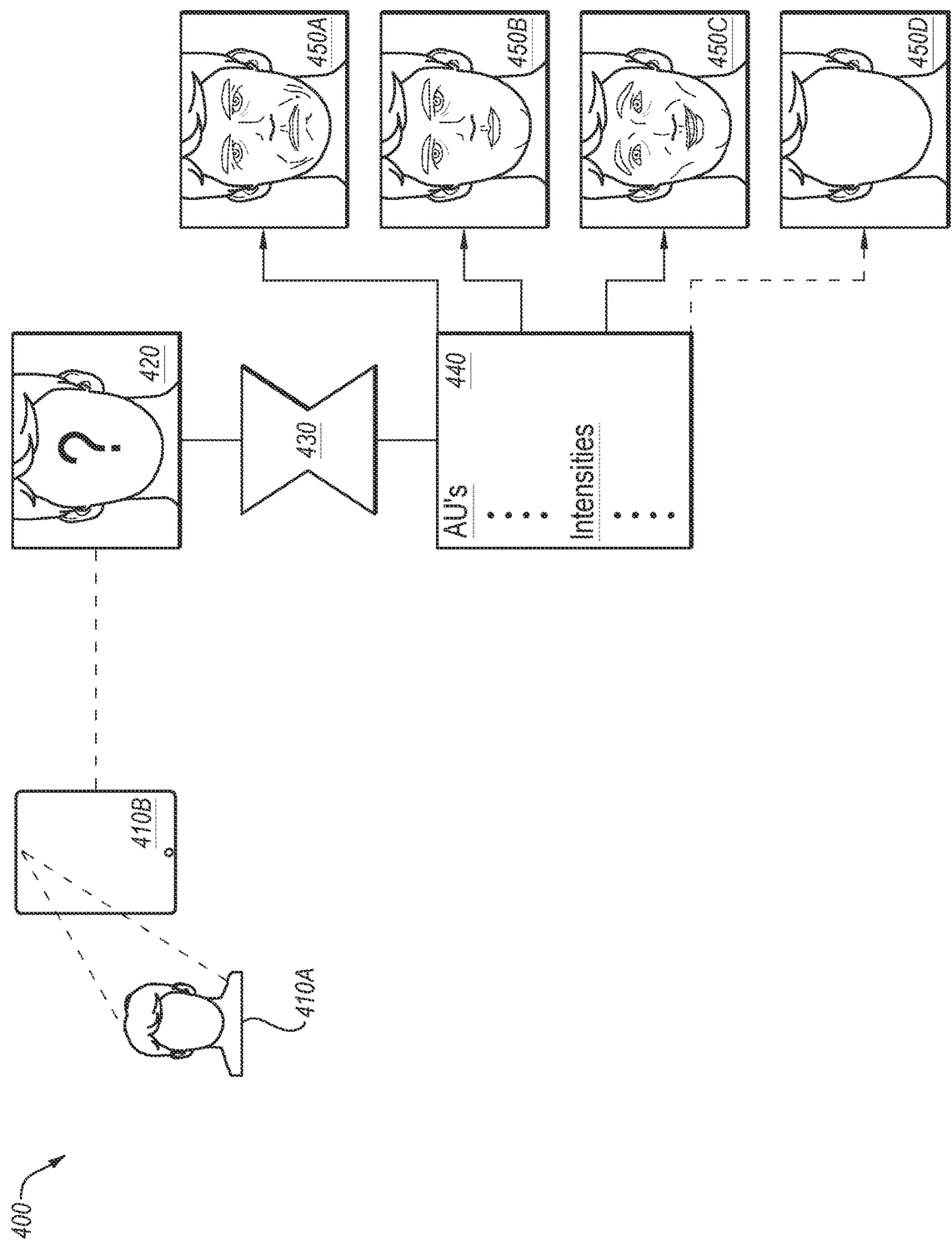
FIG. 4 illustrates an example diagram of classifying facial expressions using personalized datasets.

FIG. 4 illustrates an example environment 400 for personalized facial expression classification, in accordance with one or more embodiments in the present disclosure. The environment 400 may include a subject 410A and an imaging system 410B through which at least one input image 420 of subject 410A may be captured. A machine learning system 430, trained using a dataset including at least one input image (such as described in block 310) and one or more synthesized images of subject 410A, identifies the AU combinations and categories of intensity 440 present in the at least one input image 420. Based on the AU combinations and categories of intensity 440, the facial expression may be classified as, for example, a frown 450A, a neutral expression 450B, a smile 450C, or any other associated facial expression 450D.

As an example of operation for the environment 400, the subject 410A may be watching an advertisement on the imaging system 410B (e.g., a smart phone) and the subject 410A may be watching the advertisement on a video streaming service (e.g., Hulu®). The imaging system 410B may collect the at least one image 420 from the subject 410A while watching the advertisement, or the imaging system 410B may collect several, successive images of the subject 410A throughout the advertisement. The machine learning system 430 may identify the AU combinations and associated categories of intensity 440 from the at least one image 420. If the AU combinations and associated categories of intensity 440 identify that the subject 410A is smiling as depicted in the smile facial expression 450C, for example, then the information may be passed on to advertisers that the subject 410A is open to advertisements either from that company or that depict similar subject matter. As another example, if the AU combinations and associated categories of intensity 440 identify that the subject 410A is frowning as depicted in the frowning facial expression 450A, for example, the advertiser may infer that the subject 410A is not open to the subject matter of the advertisement. The overall resulting inference from the information collected from the identified AU combinations and associated categories of intensity 440 may depend, for example, on the subject matter of the advertisement, the average facial expressions of the subject 410A, the overall clarity of the at least one image 420, the subject matter of the video the subject 410A was watching prior to the advertisement, the change in facial expressions of the subject 410A throughout the advertisement, etc.

The machine learning system 430 may include any system, device, network etc. that is configured to be trained based on a dataset (such as the dataset identified in block 340) such that the machine learning system is able to identify the AU combinations and respective categories of intensity in at least one image 420. In some embodiments, the machine learning system 430 may be trained using a personalized dataset including at least an input image of the subject 410A and synthesized images of the subject 410A. For example, as described in the method 300 (such as the blocks 310-340), one or more images of the subject may be synthesized to provide a more robust spectrum of AU combinations and/or intensities in the training set used to train the machine learning system 430. In some embodiments, the training data set for the machine learning system 430 includes only images of the subject 410A.

The imaging system 410B may be any system configured to capture images, store the images, and/or send the image via a network to store in a remote server or to some other device or location capable of electronic storage. In some embodiments, the imaging system 410B may be the same imaging system through which the image is obtained to synthesize images for training the machine learning system 430 (e.g., the imaging system associated with the block 310, and/or the same imaging system from which the subject is identified in the block 360). For example, the subject 410A may log in to a mobile application that may perform one or more of the operations of the method 300 of FIG. 3 and, in the process of starting the mobile application, the device may use facial recognition processes, password authentication, passcode authentication, iris scanning etc. to identify the subject. Additionally or alternatively, the imaging system 410B may capture at least one image 420 of the identified subject 410A. In some embodiments, the imaging system 410B may direct another device to monitor the subject and/or obtain at least one input image 420 of the subject 410A. In some embodiments, the imaging system 410B may be playing an advertisement from a media platform, and at the same time while presenting the advertisement, the imaging system 410B may be capturing at least one image 420 of the identified subject 410A. In these and other embodiments, such captured images 420 may be used to classify the facial expression of the subject 410A, thereby interpreting the reaction of subject 410A to the advertisement.

At least one image 420 of subject 410A may be an image including at least the face of subject 410A where the subject is facing the imaging device 410B such that the entire face is substantially visible to imaging system 410B. In some embodiments, the captured image 420 may be the image obtained in block 310 and/or the image captured to identify the subject in block 360 in the method 300 of FIG. 3.

The AU combinations and categories of intensity 440 may include just AU combinations and/or AU combinations and associated categories of intensity. In some embodiments, the AU combinations and categories of intensity 440 may be identified in their totality in at least one image 420. For example, the machine learning system 430 may identify AU combinations and categories of intensity 440 such that AU combination 1, 4, 10, 20, and 25 (which is the prototypical AU combination for what may be categorized as "fearfully disgusted") in conjunction with the associated intensity for each of the AUs may be determined. Additionally or alternatively, the machine learning system 430 may generate the AU combinations and categories of intensity 440 such that only the presence or absence of a physical facial expression or trait of a facial expression is identified based on the absence or presence of a given AU in the combination. For example, the AU combinations and categories of intensity 440 may list only the presence or absence of AUs 6 and 12.

The facial expression classifications 450A-D may be classified according to descriptive physical characteristics. For example, the facial expressions may be classified as a frown 450A, a neutral expression 450B, a smile 450C, or any other facial expression 450D reasonably inferred from the AU combinations and categories of intensity 440. In some embodiments, the classification of a physical characteristic (e.g., a smile 450C) may be classified as a "like" on a social media post or, depending on the AU combinations and categories of intensity 440, a smile 450C may be classified as receptive or open to an advertisement. Additionally or alternatively, the frowning facial expression 450A may be classified as unreceptive or closed to an advertisement, pain, discomfort, depression, or sadness for a medical patient, etc.

Modifications, additions, or omissions may be made to the environment 400 without departing from the scope of the disclosure. For example, the designations of different elements in the manner described is meant to help explain concepts described herein and is not limiting. Further, the environment 400 may include any number of other elements or may be implemented with other systems or environments than those described.

Figure 5:
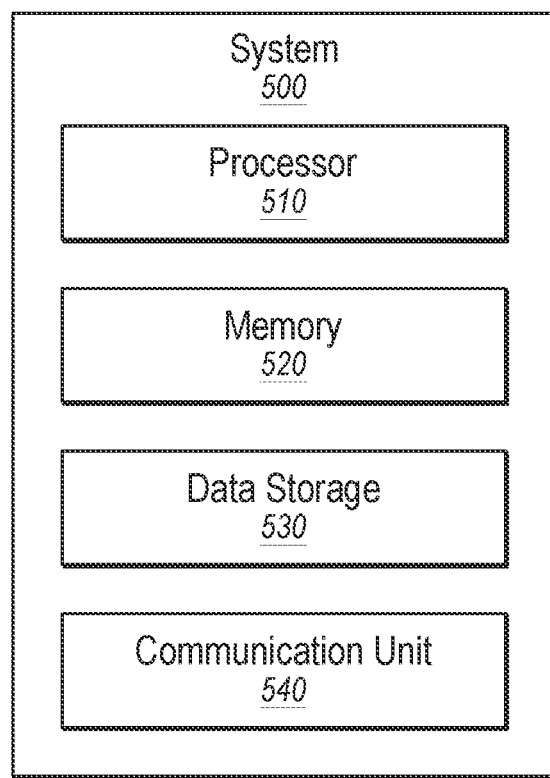
FIG. 5 illustrates an example computing system.

FIG. 5 illustrates an example computing system 500, according to at least one embodiment described in the present disclosure. The computing system 500 may include a processor 510, a memory 520, a data storage 530, and/or a communication unit 540, which all may be communicatively coupled. Any or all of the environments 100 and 400 of FIGS. 1 and 4, components thereof, or computing systems hosting components thereof may be implemented as a computing system consistent with the computing system 500.

Generally, the processor 510 may include any computing entity or processing device, including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to perform the method 300 of FIG. 3. For example, the processor 510 may obtain instructions regarding determining a number of images to be synthesized to personalize a dataset and synthesizing the images.

The memory 520 and the data storage 530 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as computing devices and/or other networks.

One of skill in the art, after reviewing this disclosure, may recognize that modifications, additions, or omissions may be made to the system 500 without departing from the scope of the present disclosure. For example, the system 500 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
    obtaining a facial image of a subject;
    identifying a number of new images to be synthesized with target Action Unit (AU) combinations and categories of intensity;
    synthesizing a number of new images using the facial image of the subject as a base image in the synthesis, a plurality of the number of new images including the one or more identified target AU combinations and categories of intensity;
    adding the number of new images to a dataset such that the dataset includes only images of the subject; and
    training a machine learning system using the dataset, the machine learning system trained to identify a facial expression of the subject.

2. The method of claim 1, wherein the dataset comprises only the facial image of the subject and the number of new images synthesized from the facial image of the subject.

3. The method of claim 1, wherein the facial image of the subject includes a neutral expression.

4. The method of claim 1, wherein capturing the facial image of the subject comprises capturing a plurality of images of the subject.

5. The method of claim 1, wherein identifying the number of new images to be synthesized with the number of target AU combinations and categories of intensity comprises verifying that at least one image depicts each category of intensity for each AU.

6. The method of claim 1, further comprising:
identifying at least one AU combination and at least one category of intensity in the facial image of the subject; and
determining a set of target AU combinations and categories of intensity based on the facial image of the subject.

7. The method of claim 1, further comprising:
identifying the subject;
classifying the facial expression of the subject by identifying each AU combination and category of intensity using the machine learning system.

8. The method of claim 7, wherein identifying the subject is performed via an identification technique including at least one of facial recognition, password verification, passcode verification, fingerprint verification, iris scan, or multifactorial authentication.

9. One or more non-transitory computer-readable media configured to store one or more instructions that, in response to being executed by one or more processors, cause a system to perform operations, the operations comprising:
obtaining a facial image of a subject;
identifying a number of new images to be synthesized with target Action Unit (AU) combinations and categories of intensity;
synthesizing the number of new images using the facial image of the subject as a base image, a plurality of the number of new images having different AU combinations than the facial image of the subject;
adding the number of new images to a dataset such that the dataset includes only images of the subject; and
training a machine learning system using the dataset, the machine learning system trained to identify a facial expression of the subject.

10. The one or more computer-readable media of claim 9, wherein the dataset comprises only one or more facial images of the subject and the number of new images synthesized from the facial image of the subject.

11. The one or more computer-readable media of claim 9, wherein identifying the number of new images to be synthesized with the number of target AU combinations and categories of intensity comprises verifying that at least one image depicts each category of intensity for each AU.

12. The one or more computer-readable media of claim 9, the operations further comprising:
identifying at least one AU combination and at least one category of intensity in the facial image of the subject; and
determining a set of target AU combinations and categories of intensity based on the facial image of the subject.

13. The one or more computer-readable media of claim 9, the operations further comprising:
identifying the subject; and
classifying the facial expression of the subject by identifying each AU combination and category of intensity using the machine learning system.

14. The one or more computer-readable media of claim 13, wherein identifying the subject is performed via an identification technique including at least one of facial recognition, password verification, passcode verification, fingerprint verification, iris scan, or multifactorial authentication.

15. A system comprising:
one or more processors; and
one or more non-transitory computer-readable media configured to store instructions that, in response to being executed by the one or more processors, cause the system to perform operations, the operations comprising:
obtaining a facial image of a subject;
identifying a number of new images to be synthesized with target Action Unit (AU) combinations and categories of intensity;
synthesizing the number of new images using the facial image of the subject as the base image, with the number of target AU combinations and categories of intensity, a plurality of the number of new images having different AU combinations than the facial image of the subject;
adding the number of new images to a dataset, the dataset including only one or more facial images of the subject and the number of new images synthesized using the facial image of the subject; and
training a machine learning system using the dataset, the machine learning system trained to identify a facial expression of the subject.

16. The system of claim 15, wherein identifying the number of new images to be synthesized with the number of target AU combinations and categories of intensity comprises verifying that at least one image depicts each category of intensity for each AU.

17. The system of claim 15, the operations further comprising:
identifying at least one AU combination and at least one category of intensity in the facial image of the subject; and
determining a set of target AU combinations and categories of intensity based on the facial image of the subject.

18. The system of claim 15, the operations further comprising:
identifying the subject; and
classifying the facial expression of the subject by identifying each AU combination and category of intensity using the machine learning system.

19. The system of claim 15, wherein identifying the subject is done through an identification technique including at least one of facial recognition, password verification, passcode verification, fingerprint verification, iris scan, or multifactorial authentication.

* * * * *